Patented Apr. 15, 1941

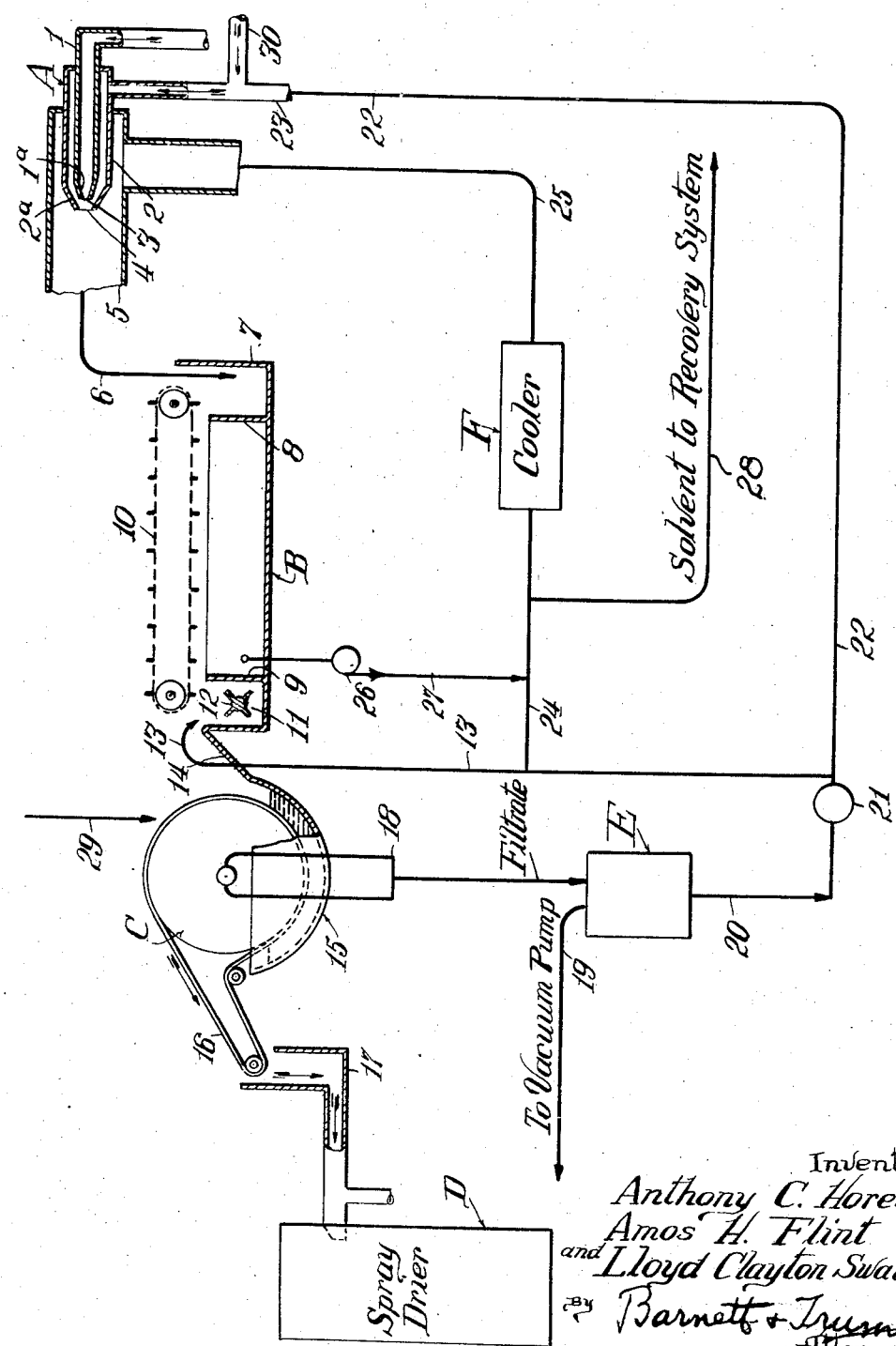

2,238,591

UNITED STATES PATENT OFFICE 2,238,591

PROCESS OF PRECIPITATING ZEIN FROM ITS SOLUTION

Anthony C. Horesi, Downers Grove, Amos H. Flint, Chicago, and Lloyd Clayton Swallen, Pekin, Ill., assignors, by mesne assignments, to Corn Products Refining Company, New York, N. Y., a corporation of New Jersey Application June 18, 1938, Serial No. 214,512

7 Claims. (Cl. 18—54)

This invention relates to the precipitation of zein from its solution. The primary object of the invention is to provide a new and improved method whereby the zein may be precipitated in the form of small solid particles of filamentary or fibrous character which can be dried, and if need be, further comminuted, to give a dry, granular, free-flowing material.

It has been customary to precipitate zein from its solution, in aqueous alcohol, for example, in the form of a dough which is then rolled out into sheets and the sheets soaked in water in order to complete the precipitation of the zein by removal of residual solvent. The process of the instant invention is more expeditious, convenient and economical than the process just outlined and gives a product of better quality.

In accordance with this invention, the zein solution is projected in the form of a fine stream (which might be multiplied) into a flowing body of precipitating agent, preferably water, which, however, may contain some of the solvent alcohol; and the stream of zein solution is changed into solid threads, filaments or fibres of zein by the diffusion of the solvent from the zein into the flowing body of water; the zein mass in its fibrous or filamentary form being carried along by the water, until precipitation is complete, and substantially all of the solvent removed, the material being preferably aerated so that in the final stage of the flow it will float; whereupon the zein mass is withdrawn from the water and dried. It would be possible to form the projected streams of the zein solution by forcing the solution through one or more very minute orifices; but a more practical way is that disclosed herein in accordance with which the solution passes under pressure through a fairly large orifice, say one-sixteenth of an inch in diameter, more or less, and is surrounded by a concentric envelope of water which is directed inwardly, by the form of the nozzle through which it is forced, against the stream of zein so that the zein stream by the velocity and turbulence of the surrounding water envelope is drawn out to a small diameter and broken up into a loose mass of short fibrous, thread-like or filamentary bodies. The air for aerating and floating the zein mass in the water may be and is preferably introduced through the water nozzle which forms the water envelope just referred to.

Apparatus suitable for practicing the process of this invention is shown in the accompanying drawing which is a diagrammatic layout of a preferred form of such apparatus. The invention, however, is not limited to this or to any other particular form of apparatus.

Referring to the drawing, A is a nozzle consisting of an inner tubular member 1 for the zein solution and an outer concentric tubular member 2 through which is forced an aqueous dispersing and precipitating medium referred to above as the water envelope; the nozzle members being preferably formed with sharply tapered ends 1a and 2a, respectively, providing restricted outlet orifices 3 and 4. The forward end of the nozzle A is enclosed in a conduit 5, of which pipe 6 is a continuation which extends to the weir box 7 of a flotation tank B, the latter being provided at its opposite ends with weirs 8 and 9. A chain drag 10 carries the zein filaments, which, being aerated, float on the surface of the liquid in the flotation tank B, into a mixing box 11, preferably provided with a rotating agitator 12 arranged at the end of the flotation vessel. The zein passes from the mixing box 11 by an apron 14 into the receiving vessel 15 of a vacuum filter C preferably of the drum and string type, the strings 16 of which deliver the dewatered zein to a conduit 17 leading to a spray drier D. The material may be ground before being spray-dried.

The process involves preferably a continuous circulation of water, from which some is withdrawn continuously, for the recovery of the zein solvent; and the circulatory system is constituted as follows:

Fresh water enters at 29 and is used for washing the zein on filter C. Filtrate and wash water from filter C pass through pipe 18 to receiver E connected by a pipe 19 with the vacuum pump (not shown) for operating the filter. From receiver E the filtrate is forced, by pump 21, in part through pipe 13 to mixing box 11; in part through pipe 24 to a cooler F and thence through pipe 25 to the conduit 5—6; and in part through pipe 22—23 to the outer or envelope forming member 2 of nozzle A. Water is withdrawn from the flotation vessel B and introduced into pipe 24 by pump 26 located in pipe 27. A certain amount of water and alcohol mixture is withdrawn from the circulatory system through pipe 28 leading to the solvent recovery system. This withdrawal, conditioned by the amount of fresh water introduced at 29, is so calculated as to maintain a relatively low alcohol content in the precipitating medium for insuring precipitation of the zein, but a high enough concentration to make recovery of the solvent discharged at 28 profitable.

Compressed air is introduced into the induction pipe 23 of the outer member 2 of nozzle A through branch pipe 30. The purpose of this is to aerate the zein when reduced to the filamentary form, so as to insure the flotation thereof in vessel B through which the velocity of flow is necessarily retarded. The air could be introduced at any suitable point in the system.

In practicing the process it is preferable to use a relatively heavy zein solution, one containing between 10 and 30 parts by weight of protein per 100 parts of zein solution, although operation within this range is not essential. A suitable solution is one which is obtained by treating the zein extract with enough of a hydrocarbon, or other solvent of maize oil and coloring matter, to bring about a separation of the mixture into two liquid phases, the heavier of which contains the zein; this heavy liquid being used either directly in the precipitating operation, or after dilution with alcohol, or after removal of oil solvent by distillation. The precipitating medium is cooled in cooler F to a temperature between 30° F. and 68° F. It should not be substantially in excess of 68° F. (20° C.) and preferably is below 59° F. (15° C.). It may have an alcohol content of 10% or less by volume. The orifice 3 through which the zein solution is ejected may be about 1/16 of an inch in diameter; and the orifice 4 of the surrounding nozzle member 2 may be between 3/32 of an inch and 1/8 of an inch in diameter. The pressure of the zein solution is preferably from 25 to 50 pounds per square inch and its rate of feed from 5 to 20 gallons per hour. The pressure of the dispersing fluid passing through nozzle member 2 may be 30–40 pounds per square inch and its rate of flow 70 to 150 gallons per hour. These conditions are not to be regarded as limitations.

Under these or similar conditions the zein issues from the spray nozzle in the form of a stream of liquid about 1/16 of an inch in diameter surrounded by a concentric envelope of water which moves at higher velocities than the zein stream and the main water stream through conduit 5—6 and is directed inwardly against the zein stream by the conical form 2a of the nozzle member 2. The zein is drawn out into a very fine stream by the velocity and turbulence of the surrounding water envelope and the alcohol solvent of the zein is diffused into the water of the surrounding envelope and into the larger body of water flowing through conduit 5, whereby the zein is precipitated in the form of filaments about 0.02 to 0.04 of an inch in diameter. As the zein continues to move through the conduit 5—6 and through the flotation vessel B, further diffusion of solvent takes place, which is very complete because of the finely divided form of the zein. When dried the filaments, which are of spongy character, will crumble into small flakes or particles so that the material will be granular and relatively free flowing. The water and air introduced through the nozzle 2 besides spinning out the zein in fine filamentary form creates a turbulence in the loose mass of filaments which tends to disperse the mass in the precipitating liquid and to bring fresh liquid continuously into contact with the zein threads to promote extraction of the solvent.

The following are specific examples of the application of the invention to practice. These examples are purely typical and informative. The operating data might be changed very considerably without departure from the principles of the invention, as will be evident. The intention, in fact, is to cover all equivalents and all modifications of the process within the scope of the appended claims.

*Example 1.*—The orifice of the zein solution nozzle member is 1/16 of an inch in diameter and the orifice of the surrounding nozzle member 2 7/64 of an inch in diameter. The first mentioned orifice being placed 1/16 of an inch behind the other. The concentration of the zein is 28 parts by weight to 100 parts of the solvent. The pressure of the zein solution on the nozzle is 35 pounds per square inch; the water pressure 40 pounds per square inch. The zein solution passes through the nozzle at the rate of 7 gallons per hour. The rate of the water through the nozzle member 2 is 100 gallons per hour. The precipitating medium is circulated through the cooler conduit 5—6 and flotation vessel B at the rate of 40 gallons per minute. The water thus circulated has an alcohol concentration of about 10% by volume, whereas the filtrate from filter C has a lower concentration, about 5%. The material can be partially de-watered in the filter C to a water content of about 74% by weight. Drying in the air at room temperature yields a light, fluffy zein which dissolves in alcohol with extreme ease.

*Example 2.*—The solution is made up of 20 parts of zein, by weight, 80 parts of the solvent, aqueous ethyl alcohol. The nozzle may have the same dimensions as in Example 1. The pressure of the zein solution in the nozzle is 50 pounds per square inch and the quantity 20 gallons per hour. The pressure of water in the outer member of the nozzle is 30 pounds per square inch and the quantity of water 70 gallons per hour. The water is circulated through conduit 5 past nozzle A at the rate of 50 gallons per minute. The water in circulation is maintained at a temperature below 65° F. (18.3° C.). The temperature range may be anywhere between 30° F. (−1.1° C.) and 68° F. (20° C.), preferably between 50° F. (10° C.) and 60° F. (15.6° C.).

This application is a continuation in part of co-pending application filed August 18, 1937, Serial No. 159,728.

We claim:

1. Process of precipitating zein from its solution which comprises: projecting into a moving body of precipitating medium a stream of zein solution surrounded by a concentric envelope stream of the precipitating medium of sufficient velocity and turbulence to effect dispersion of the zein in finely divided form.

2. Process of precipitating zein from its solution which comprises: projecting into a moving body of precipitating medium a stream of zein solution surrounded by a concentric envelope stream of the precipitating medium; and aerating the mixture to keep the zein in suspension.

3. Process of precipitating zein from its solution which comprises: projecting into a moving body of precipitating medium a stream of zein solution surrounded by a concentric envelope stream of the precipitating medium which is inwardly directed against the zein stream.

4. Process of precipitating zein from its solution which comprises: injecting into a moving body of precipitating medium a stream of zein solution, within an enveloping stream of the precipitating medium whereby the zein is reduced to a filamentary form; and keeping the solidified zein in suspension in the precipitating agent until the solvent is substantially completely removed by diffusion.

5. Process of precipitating zein from an alcohol solution of the same which comprises: projecting into a moving body of water a stream of zein surrounded by an enveloping stream of water to reduce the zein to a filamentary form.

6. Process of precipitating zein from an alcohol solution of the same which comprises: projecting into a moving body of water a stream of zein surrounded by an enveloping stream of water and air to reduce the zein to a filamentary form.

7. Process of precipitating zein from its solution in aqueous alcohol which comprises: spraying the solution using water and air as a dispersing medium into a rapidly moving body of water; introducing the water and zein into a flotation vessel and floating off the zein; filtering the zein and washing same with fresh water; continuously circulating the filtrate and wash water from the filter through the spray nozzle and past the nozzle into the flotation vessel; and drawing off enough water to maintain an alcohol concentration in moving body of water of approximately 10% by volume.

ANTHONY C. HORESI.
AMOS H. FLINT.
LLOYD CLAYTON SWALLEN.